United States Patent [19]

Scher et al.

[11] Patent Number: 5,421,939
[45] Date of Patent: Jun. 6, 1995

[54] PREFABRICATED SOLAR WINDOW FILM GRAPHICS AND A METHOD FOR MANUFACTURING AND APPLYING THE SAME

[76] Inventors: Frederick K. Scher, 33 Astro Pl., Dix Hills, N.Y. 11746; Stephen J. Scher, 294 Fairhaven Blvd., Woodbury, N.Y. 11797

[21] Appl. No.: 140,576

[22] Filed: Oct. 21, 1993

[51] Int. Cl.⁶ .................... G09F 9/00; B32B 31/00
[52] U.S. Cl. .................... 156/235; 156/247; 156/248; 156/249; 40/594; 40/615; 40/630
[58] Field of Search .............. 156/235, 268, 247, 248, 156/249, 252, 253; 40/594, 615, 630

[56] References Cited

U.S. PATENT DOCUMENTS

| | | | |
|---|---|---|---|
| 2,559,756 | 7/1951 | Buck | 156/235 X |
| 2,598,755 | 6/1952 | Birch | 156/249 X |
| 3,472,719 | 10/1969 | Lythgoe | 156/236 |
| 3,692,604 | 9/1972 | Grocman | 156/247 X |
| 3,924,879 | 12/1975 | Wright | 282/28 R |
| 4,208,231 | 6/1980 | Hoppe | 156/252 X |
| 4,330,350 | 5/1982 | Andrews | 156/152 |
| 4,342,155 | 8/1982 | Waldron | 33/184.5 |
| 4,479,319 | 10/1984 | Erlich | 40/595 |
| 4,559,732 | 12/1985 | Levy et al. | 40/595 |
| 4,568,403 | 2/1986 | Egan | 156/247 X |
| 4,624,875 | 11/1986 | Watanabe | 428/41 X |
| 4,855,171 | 8/1989 | Mckie et al. | 428/40 |
| 4,859,512 | 8/1989 | Jones | 156/249 X |
| 4,900,392 | 2/1990 | Bradshaw et al. | 156/541 |
| 4,940,622 | 7/1990 | Leavitt, Sr. et al. | 428/137 |
| 5,010,672 | 4/1991 | Coleman | 40/615 |
| 5,073,424 | 12/1991 | Dressler | 40/615 X |
| 5,213,656 | 5/1993 | Lis et al. | 156/630 |
| 5,248,536 | 9/1993 | Du Katz | 40/594 X |
| 5,318,325 | 7/1994 | Ipsen | 40/594 X |

FOREIGN PATENT DOCUMENTS 2123198 1/1984 United Kingdom ............ 156/249

Primary Examiner—David A. Simmons
Assistant Examiner—Charles Rainwater
Attorney, Agent, or Firm—Hoffmann & Baron

[57] ABSTRACT

A method of fabricating a solar window film graphic for attachment to a substantially translucent surface such as a glass window includes generating a design with a computer-aided design system and cutting solar window film in accordance with the generated design under the controlled guidance of a computer-aided machining system. Appropriate portions of the solar window film are removed in accordance with the generated design and a transfer tape is attached to the solar window film for securing the solar window film to a carrier film. The carrier film and solar window film combination is secured to a support film for attachment to a translucent surface.

14 Claims, 6 Drawing Sheets

PREFABRICATED SOLAR WINDOW FILM GRAPHICS AND A METHOD FOR MANUFACTURING AND APPLYING THE SAME

BACKGROUND OF THE INVENTION

Field Of The Invention

This invention relates to solar window film graphics, and more particularly relates to prefabricated solar window film graphics for application to surfaces and a method of making the same.

Description Of The Prior Art

Attachment of translucent and transparent solar window film graphics to a glass window of a store or building are known in the field of sign making. Typically, a solar window film graphic is manufactured on site by applying layers of film material to the window and removing portions of the same to depict a design. As described in U.S. Pat. No. 4,559,732, this method generally includes applying a first film material onto a first side of the window, providing a mirror image of the design to a second side of the window so that the design appears normal to a viewer on the first side of the window, cutting the first film in accordance with the outline of the design and removing regions of the first film (commonly called weeding) so that portions of the film which are required to form the design remain attached to the window. The process is generally repeated by adding additional layers of film having different colors in order to make the design more attractive and distinctive.

The above-described method of making solar window film graphics on site has many drawbacks. First, the graphic is produced on the window of the storefront by tracing and cutting numerous layers of film material. Even for relatively simple designs, this procedure can take a great deal of time due to the precision required for cutting and removing the various layers of film to form the graphic. As a result, the on-site manufacturing process frequently disrupts the business activity of the store to which the graphic is being applied resulting in a loss of revenue for the proprietor. Second, the quality of the graphics that are produced is generally inconsistent because each layer of film is cut and weeded by hand while the film is already applied to the window. Mistakes in cutting and weeding are frequently made and must be corrected. Further, layering of films one upon another at the storefront commonly results in dust and dirt being caught between layers of material which effects the quality, aesthetic appearance and useful life of the solar window film graphic.

OBJECTS AND SUMMARY OF THE INVENTION

It is therefore an object of the present invention to provide a method of producing a solar window film graphic which is manufactured with the aid of a computer and assembled in a controlled environment prior to application to a surface.

It is a further object of the present invention to provide a prefabricated solar window film graphic and a method of making and applying the same to a surface which overcomes the inherent disadvantages of known window graphics and methods of manufacture.

In accordance with one form of the present invention, a method of fabricating a solar window film graphic for attachment to a first side of a substantially planar surface, such as a glass window of a storefront, for viewing from a second side of the storefront includes the integration of computer-aided design and computer-aided manufacturing.

Specifically, the method of the present invention includes generating a design to be displayed on the substantially planar surface with a computer-aided design system and determining a preferred representation of the design for manufacture. The preferred representation is thereafter provided to a computer-aided machining system having a cutting tool. Appropriate cuts are made with the cutting tool, under the controlled guidance of the computer-aided machining system, through a solar window film of a film sheet to provide an outline of the design on the film. The cuts in the film define extraneous portions of the window film whose removal is required to better recognize the design. The film sheet also includes a release liner coupled to the solar window film which is preferably slightly scored by the cutting tool during the cutting process.

The method further includes removing the extraneous portions of the solar window film from the film sheet while portions of the solar window film which define the design remain coupled to the release liner. Thereafter, a transfer tape is attached to the side of the film sheet having the solar window film. The release liner of the film sheet is then removed effectively transferring the solar window film from the film sheet release liner to the transfer tape to provide an unlined premasked window film. The solar window film surface of the unlined premasked window film is then secured to a carrier film of the carrier film sheet to provide a carrier film graphic. The carrier film sheet also includes a carrier film release liner coupled to the carrier film. A support film of a support film sheet is then secured to the carrier film graphic to provide a solar window film graphic. Thereafter, the release liner of the carrier film is removed so as to provide a solar window film graphic for attachment to the planar surface.

The method may also include applying at least one additional layer of window film having a substantially different color than that of the first window film used in the solar window film graphic in order to provide shading to specific regions of the design.

In accordance with another form of the present invention, a method of applying a solar window film graphic to a substantially planar panel includes fabricating the solar window film graphic utilizing a computer-aided design system and a computer-aided machining system at a location which is distal with respect to the panel to which the graphic is to be attached, transporting the solar window film graphic to the panel and affixing the graphic to the panel.

In accordance with another form of the present invention, a solar window film graphic includes a graphic layer secured to a carrier layer. The graphic layer including a plurality of solar window film portions having a plurality of contours, sizes and colors wherein the contour of each solar window film portion is generated by a cutting means of a computer-aided machining system. The graphic layer also includes a substantially optically clear support film secured to each of the solar window film portions.

A preferred form of the solar window film graphic and the method for manufacturing the same as well as other embodiments, objects, features and advantages of the invention will be apparent from the following detailed description of illustrative embodiments, which is

DETAILED DESCRIPTION OF THE PREFERRED EMBODIMENTS

Figure 1:
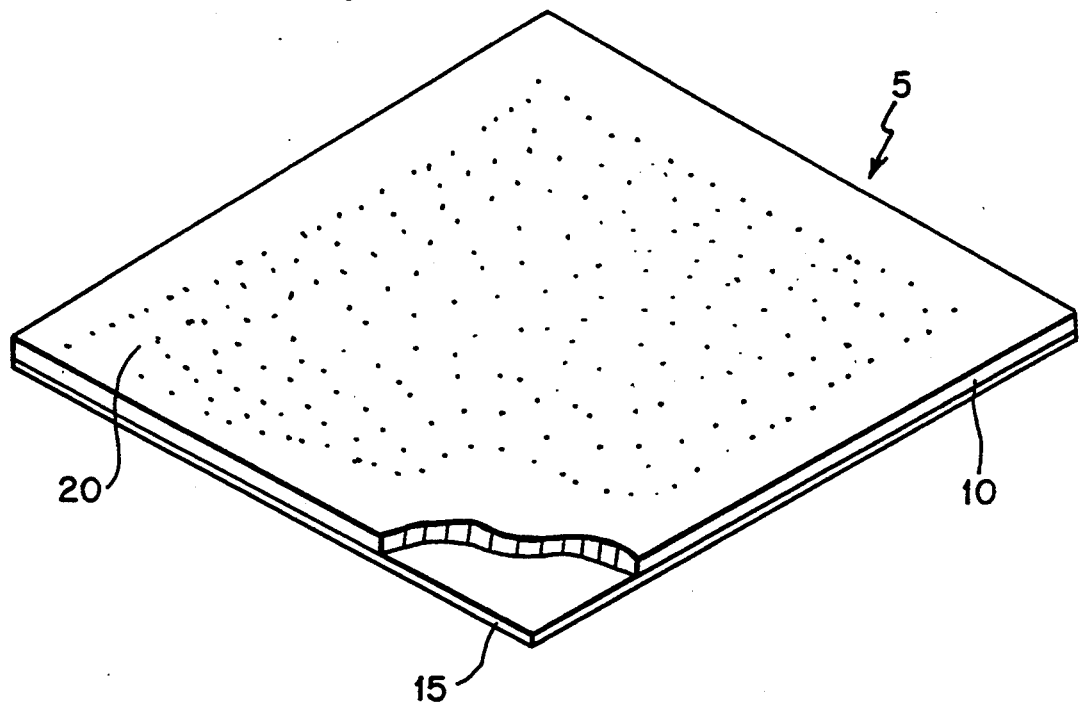
FIG. 1 is a partial cutaway perspective view of a solar window film sheet including solar window film and release liner utilized in the present invention.

The present invention incorporates the use of computer-aided design (CAD) and computer-aided machining (CAM) to a method of fabricating a solar window film graphic for attachment to a substantially planar panel such as a window of a storefront.

The method of the present invention basically includes generating a design on a computer-aided design system for fabrication of a solar window film graphic. Preferably, the design is generated by selecting one or more graphics from a data base of graphics stored in the CAD system including faces, animals, objects and border elements. If more than one graphic from the data base is selected, the images are combined in accordance with the requirements of the user to generate a new combined design. Preferably, each image contained in the computer data base is stored as a vector-based image. The combination of two designs (vector-based images) results in a combined vector-based image. If necessary, the combined vector-based image may be reviewed for excessive nodes (machine control points) which define the cutting blade movements required to produce the design. If the number of control points can be reduced without the loss of design detail, the user may alter the design and corresponding control points.

Thereafter, respective regions of the design are color shaded with the assistance of the CAD system to achieve a rendering of the final design to be produced. The CAD system may then group all similar color shaded regions of the design together for the purposes of machining.

An alternative method of generating a design includes scanning a custom hand or stock illustration into the CAD system. If such an illustration is used, the art work should be analyzed to ensure that all stray marks have been removed from the illustration and that all shaded regions are properly filled before scanning the design into the computer. Thereafter, the illustration is scanned into the CAD system using a scanner as known in the art to provide a raster image (BIT map). Once the design has been provided to the computer, the computer rendered design is reviewed to ascertain the accuracy of the scanned design and to correct any inaccuracies.

Internally within the CAD system and as is known in the field of computer-aided design, the raster image (BIT map) is vectorized to produce a Bézier curve image (vector image). Thereafter, the vector image is reviewed to ascertain whether the vector image contains an unnecessary amount of nodes (control points). The review of the nodes is necessary, as previously mentioned, because the number of nodes corresponds to the number of machine cutting instructions provided to the CAM system. An increase in machine cutting instructions corresponds to an increase in the machining time necessary to perform the total cutting process. In order to reduce the number of nodes, the vector image corresponding to the scanned illustration can be altered by providing a better fitting Bézier curve than that generated internally by the CAD system. Thereafter, elements of the illustration are color shaded to provide a color rendering of the final design.

Referring now to FIG. 1, once the desired vector-based image is determined, an appropriate size and color of a first film sheet 5 is provided to the CAM system for cutting. The film sheet 5 preferably includes a first side defined by a solar window film 10 coupled to a release liner 15 defining a second side. The solar window film 10 typically includes an adhesive 20 on one surface of the film to enable the solar window film to adhere to various media. Generally, solar window films are translucent to a viewer looking through either side of the film after the release liner is removed. Other solar window films are opaque to a viewer on one side of the film and translucent to a viewer on a second side of the film after the release liner is removed. Examples of suitable solar window films for use with the method of the present invention include those sold under the trade names SUN GUARD ®, NUN SUN ®, LLUMAR ®, REFLECTO SHIELD ®, MADACO ®, MACAL ® and DTI window films.

Before the machining process begins, the cutting blade depth of the CAM system is preferably adjusted so that the blade cuts through the solar window film 10 but only slightly scores the release liner 15 of the film sheet 5. Thereafter, the vector-based image representing the desired representation of the design is provided to the CAM system. Based upon the desired representation of the design and the color of the solar window film to be cut, the cutting blade cuts the solar window film 10 of the first film sheet 5 in accordance with the cutting instructions to provide cuts 25. Then, if desired, an appropriate size and color of a second film sheet is provided for cutting a second layer or insert of solar window film in accordance with a vector-based image provided by the CAD device. The second film represents a different portion of the design than that represented by the first film. The cutting process is repeated for each color of solar window film to be included in the solar window film graphic.

Figure 2A:
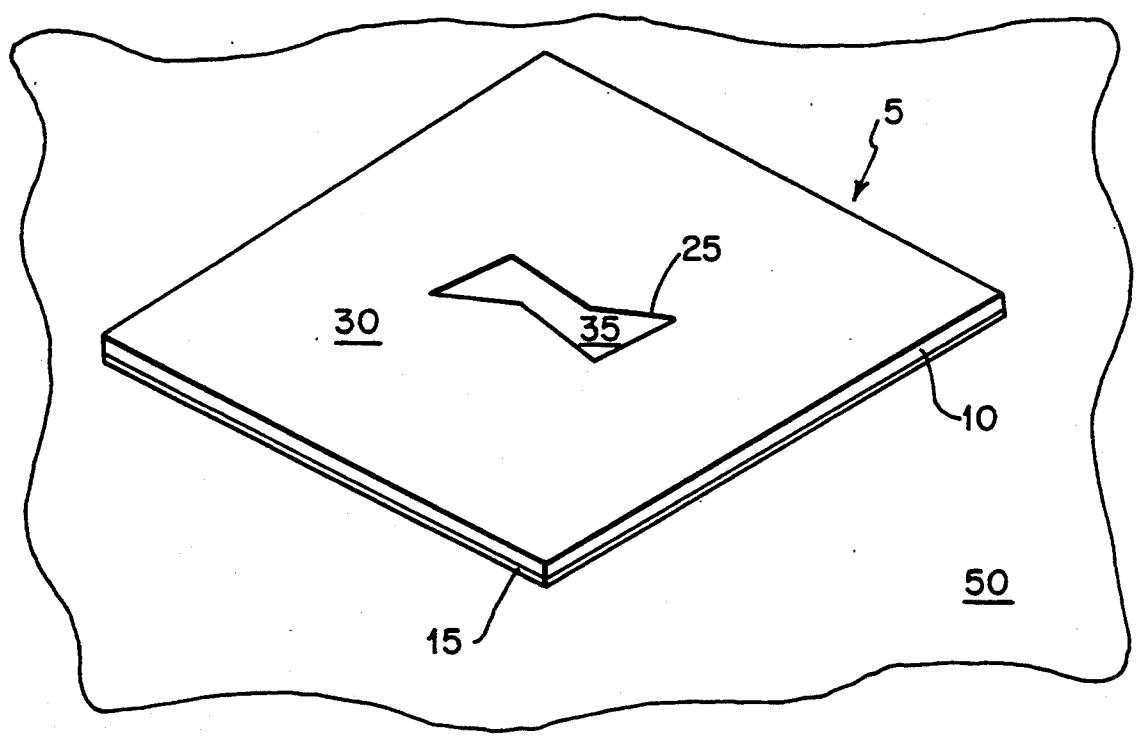
FIG. 2A is a perspective view of the solar window film sheet of FIG. 1 having cuts substantially through the solar window film.
Figure 2B:
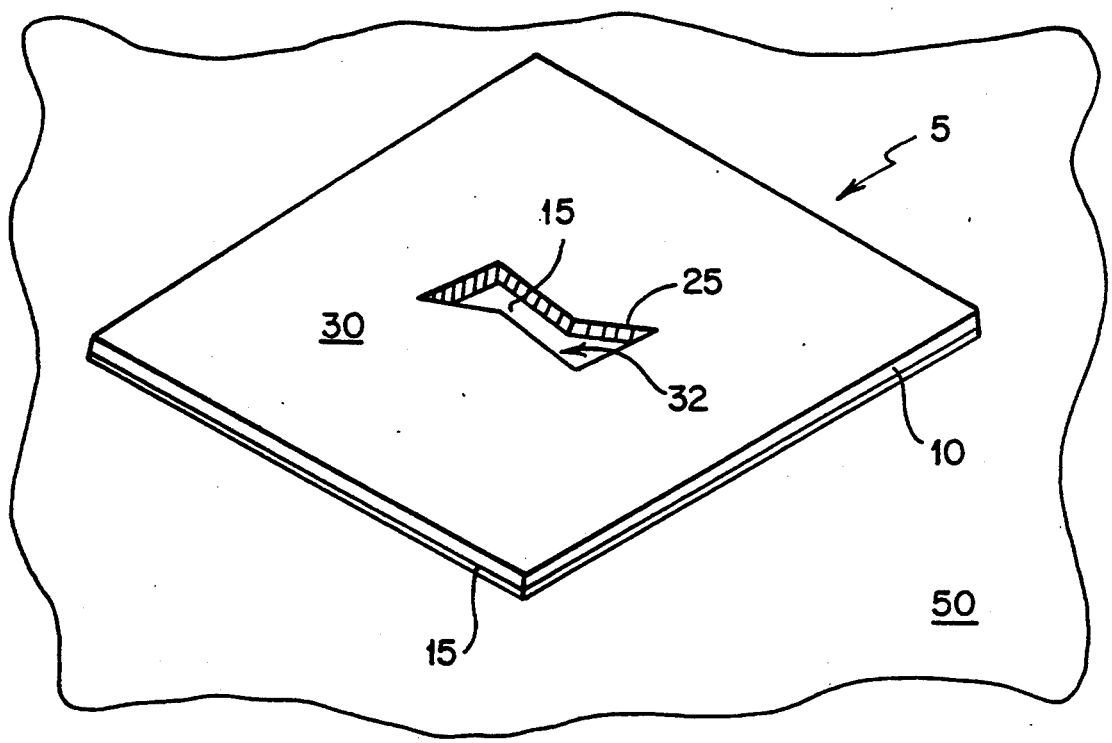
FIG. 2B is a a perspective view of the solar window film sheet of FIG. 2A wherein a region of the solar window film defined by the cuts is removed.

Referring now to FIGS. 2A and 2B, after each respective color of solar window film is cut, the film sheets are preferably placed on a large flat surface 50. Preferably, the cut film sheets are placed upon a glass light table. The glass light table includes a substantially flat transparent surface wherein a light generated by a lamp travels through the glass surface and illuminates the cuts 25 in the solar window film 10 to aid the user in recognizing the design outline. The cuts 25 in the solar window film define at least a first portion 30 of the solar window film representing the design of the solar window film graphic. The cuts in the solar window film also define a second portion 35 of the solar window film (extraneous portions) which is not included in the graphic. Areas of the solar window film corresponding to the extraneous portions 35 of the solar window film 10 are manually removed from the film sheet 5 (commonly called weeding) to provide vacant region 32. The portions of the solar window film 10 which are not removed define the design of the solar window film graphic and remain coupled to the release liner 15.

The extraneous portions 35 of the solar window film may be removed with any suitable means. Preferably, reference is made to the CAD system or the custom illustration of the design while weeding the solar window film in order to ensure that appropriate portions of the solar window film 10 are removed. In an alternative embodiment, the extraneous portions 35 of the solar window film can be removed by the cutting means in conjunction with the cutting of the film. The removal of the extraneous portions of the film is carried out for all colors of solar window film being used to generate the solar window film graphic.

Figure 3:
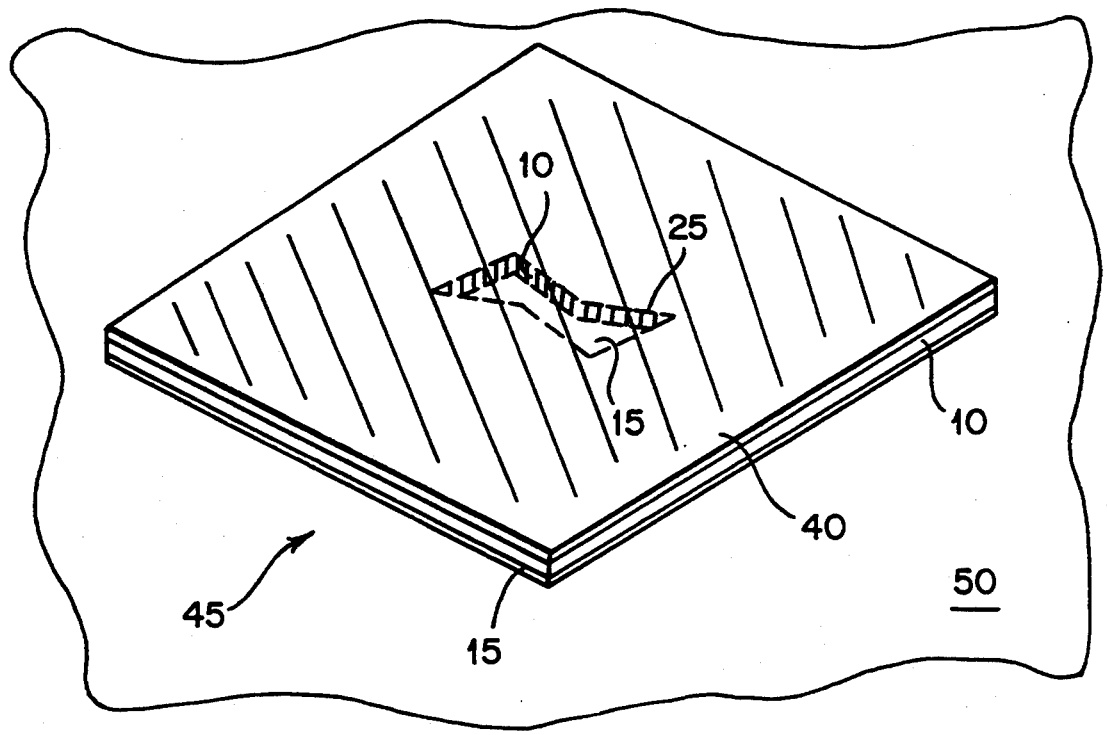
FIG. 3 is a perspective view of the solar window film sheet of FIG. 2B having transfer tape attached to the surface of the solar window film defining a premasked solar window film sheet.

Referring now to FIG. 3, the method of the present invention further includes attaching a transfer tape 40 to the first side 10 of the film sheet 5 to provide a pre-masked film sheet 45. The transfer tape 40 comes in a variety of sizes (widths and lengths) and also includes an adhesive (of varying strengths) on at least one of its surfaces. The tackiness of the adhesive of the transfer tape is dependent upon the strength of the attraction between the solar window film 10 and the release liner 15 of the film sheet 5. The tackiness of the transfer tape 40 adhesive is preferably stronger than that of the attraction between the solar window film 10 and the release liner 15.

Preferably, the transfer tape 40 is attached to the film sheet 5 in the following manner. The film sheet 5 including the release liner 15 containing the cut and weeded solar window film 10 is pulled taut while contacting the substantially flat surface 50 to insure that the film sheet 5 is substantially planar and does not have any wrinkles. Preferably, the release liner 15 faces downward and the solar window film 10 faces upward. Then, an appropriate length of transfer tape 40 corresponding to the size of the film sheet 5 is provided, pulled taut, and kept a relatively small distance above the solar window film 10 of the film sheet 5. Thereafter, the transfer tape 40 is applied to the solar window film of the film sheet. In order to facilitate the tautness of the transfer tape, a dispensing device may be utilized which comprises a shaft which extends across the width of the film sheet. The shaft preferably rests on two platforms, one on either side of the film sheet, and permits the transfer tape to be superposed with the film sheet for appropriate dispensing of the transfer tape. In the alternative, a mechanized laminating machine specifically designed for dispensing the transfer tape, as is known in the art, can be utilized.

Once the transfer tape 40 is pulled taut, it is preferably applied as follows. Beginning at one end of the transfer tape 40 while the opposite end remains elevated above the film sheet 5, the transfer tape 40 is laid upon the solar window film 10 and a downward force is applied with a burnishing device (hard plastic squeegee). As the transfer tape 40 is applied, the burnishing device is pressed against the transfer tape 40 with a series of strokes such that the path of each successive stroke is adjacent to and slightly overlapping the path of the previous stroke. If the size of the transfer tape 40 applied to the film 10 is larger than the area of the solar window film 10, the transfer tape 40 may be trimmed to correspond to the perpendicular dimensions of the design defined by the solar window film 10. The transfer tape 40 may be applied to each film sheet 5 containing weeded solar window film 10 that will be used to manufacture the solar window film graphic.

Figure 4:
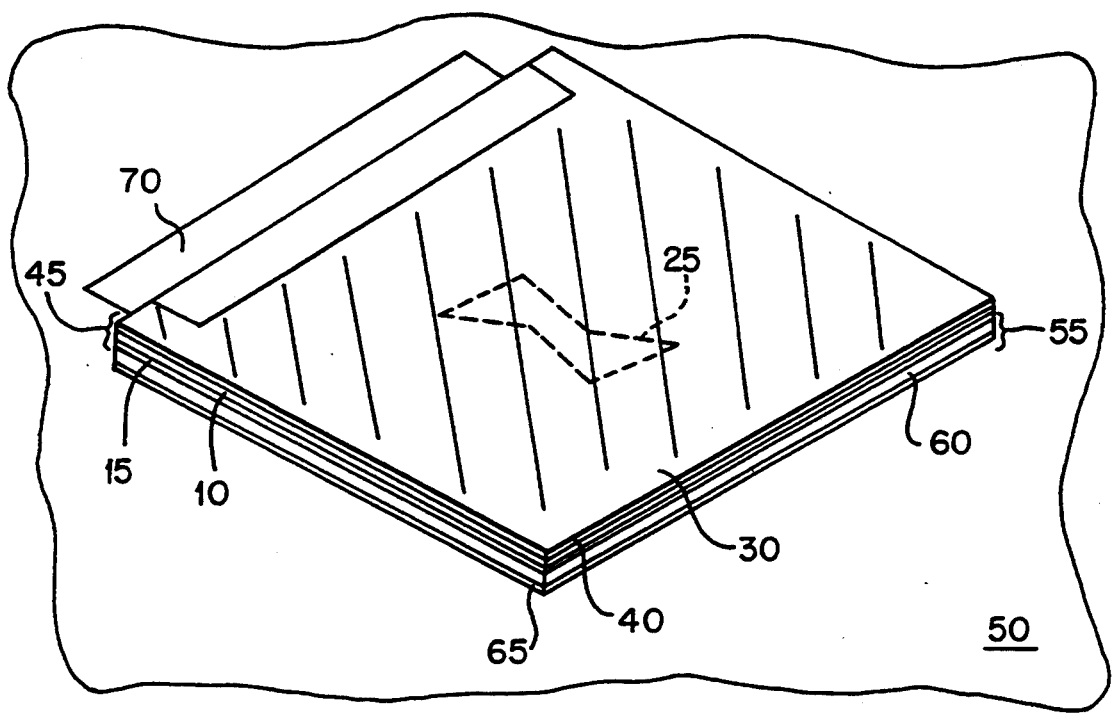
FIG. 4 is a perspective view of the pre-masked solar window film sheet of FIG. 3 being applied to a carrier film sheet.

Referring now to FIG. 4, the method also includes applying the pre-masked film sheet 45 (transfer tape and film sheet) to a carrier film sheet 55. The carrier film sheet 55 includes a carrier film 60 having a release liner 65 attached thereto. Preferably, the carrier film 60 is an optically clear polyester film with a very aggressive pressure sensitive liquid activated adhesive on at least one surface of the carrier film. Preferably, the tackiness of the adhesive is relatively strong so that the solar window film graphic can be attached to a wide variety of surfaces. The carrier film 60 is designed to provide structural rigidity to the pre-masked film sheet 45 which permits the solar window film graphic to be handled in a relatively easy fashion during installation. In addition, the carrier film 60 provides increased security protection for a storefront by preventing the window to which the solar window film graphic is attached from completely shattering if an object is propelled through the storefront.

The pre-masked film sheet 45 is preferably attached to the carrier film sheet 55 by placing the carrier film sheet 55 on a flat smooth surface 50 (such as a work table) and securing the carrier film sheet 55 to the surface by electrostatic or vacuum adhesion. The carrier film sheet is preferably cut to the measured size of the window to which it is to be secured. The carrier film sheet 55 is placed against the flat, smooth surface 50 with the carrier film release liner 65 contacting the flat surface 50 and the carrier film 60 facing substantially upward. The adhesion to hold the carrier film sheet 55 to the flat surface 50 is produced by applying a wetting solution, preferably a soapy solution, to the carrier film release liner 65 and to the flat surface 50 before application of the carrier film sheet 55. Once the carrier film sheet has been laid upon the surface, the burnishing device is provided over the surface of the carrier film sheet to remove any excess wetting solution from the space between the carrier film sheet and the flat surface so as to produce the electrostatic or vacuum adhesive bond.

The pre-masked film sheet 45 is now applied to the carrier film sheet. The pre-masked film sheet 45, with the pre-masked film sheet release liner 15 side contacting the carrier film 60, is aligned on the carrier film sheet 55 in accordance with a corresponding position in the design. The aligned pre-masked film sheet 45 is then secured in position to the carrier film sheet 55. This may be accomplished by placing a strip of adhesive tape 70, such as masking tape, along one side of the premasked film sheet. Preferably, the other portion of the adhesive tape is secured to the flat surface 50. Thereafter, the pre-masked film sheet 45 is gently pulled taut against the adhesive tape 70 so that the adhesive tape substantially operates as a hinge (i.e., the side opposite the adhesive tape should be slightly raised from the surface of the carrier film). The release liner 15 of the pre-masked film sheet is then carefully removed from the solar window film 10, making sure that the solar window film 10 does not remain attached to the release liner, to provide an unlined pre-masked solar window film sheet.

While keeping the unlined pre-masked solar window film sheet taut, the solar window film 10 is applied to the carrier film 60. First, wetting solution is applied to the surface of the carrier film 60 and to the solar window film 10. Beginning on the side of the unlined pre-masked solar window film that is secured by the adhesive tape 70 and proceeding to an opposite side of the solar window film, the solar window film 10 is secured to the carrier film 60 by passing the burnishing device over the surface of the transfer tape 40 of the unlined pre-masked solar window film, and applying pressure with the same to activate the pressure sensitive adhesive. The burnishing device is applied in a strokewise fashion wherein the path of each stroke is adjacent to and slightly overlaps the path of the proceeding stroke. The pressure that is applied to the transfer tape 70 with the burnishing device is preferably relatively gentle at first and then increased so as to remove any air or wetting solution that is trapped between the solar window film 10 and the carrier film 60 in order to promote better bonding. Thereafter, the adhesive creating the carrier film/solar window film bond is permitted to dry. This can be accelerated by the application of heat.

Figure 5:
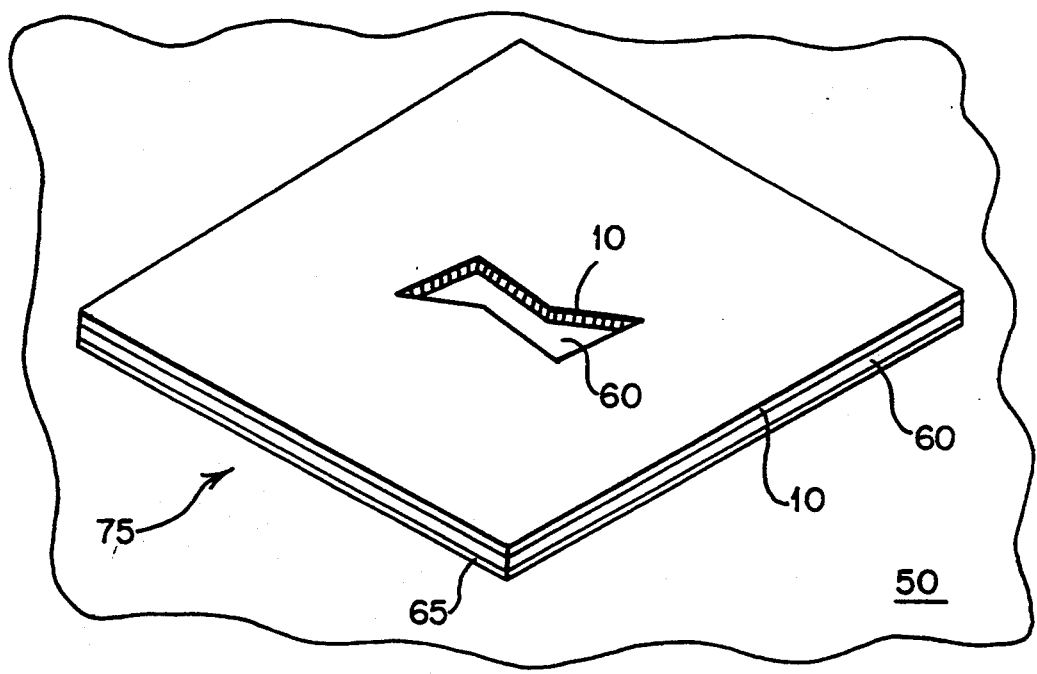
FIG. 5 is a perspective view of the pre-masked solar window film sheet of FIG. 4 having the solar window film sheet release liner and transfer tape removed from the surfaces of the solar window film.

After the carrier film/solar window film bond has sufficiently strengthened, wetting solution is applied to the surface of the transfer tape 40 in an effort to loosen and remove the adhesive bond which holds the solar window film 10 to the transfer tape 40. Once the transfer tape/solar window film adhesive bond is broken, the transfer tape 40 and adhesive tape 70 are removed from the solar window film 10 while ensuring that all portions of the solar window film 10 remain attached to the carrier film 60 as shown in FIG. 5. At this point, it is desirable to check the solar window film to make sure that all portions of the solar window film are flat against the surface of the carrier film. If kinks or wrinkles are noticed, the kinks should be removed by either applying pressure to the surface of the solar window film or by cutting the solar window film to permit one end of the film to overlap the other.

Wetting solution is then applied to the solar window film surface 10 and a protective film, preferably a relatively thin clear polyester material (not shown) such as MYLAR ®, is placed over the solar window film/carrier film element 75 by gently applying pressure to the protective film with a burnishing device to activate the pressure sensitive adhesive. Thereafter, an increased pressure may be applied with a heavier burnishing device to insure that the film elements are firmly secured to the carrier film. The squeegee is preferably passed over the surface of the protective film with overlapping strokes as previously described. Once it is determined the film elements are properly secured in place, the protective film is removed.

Figure 6:
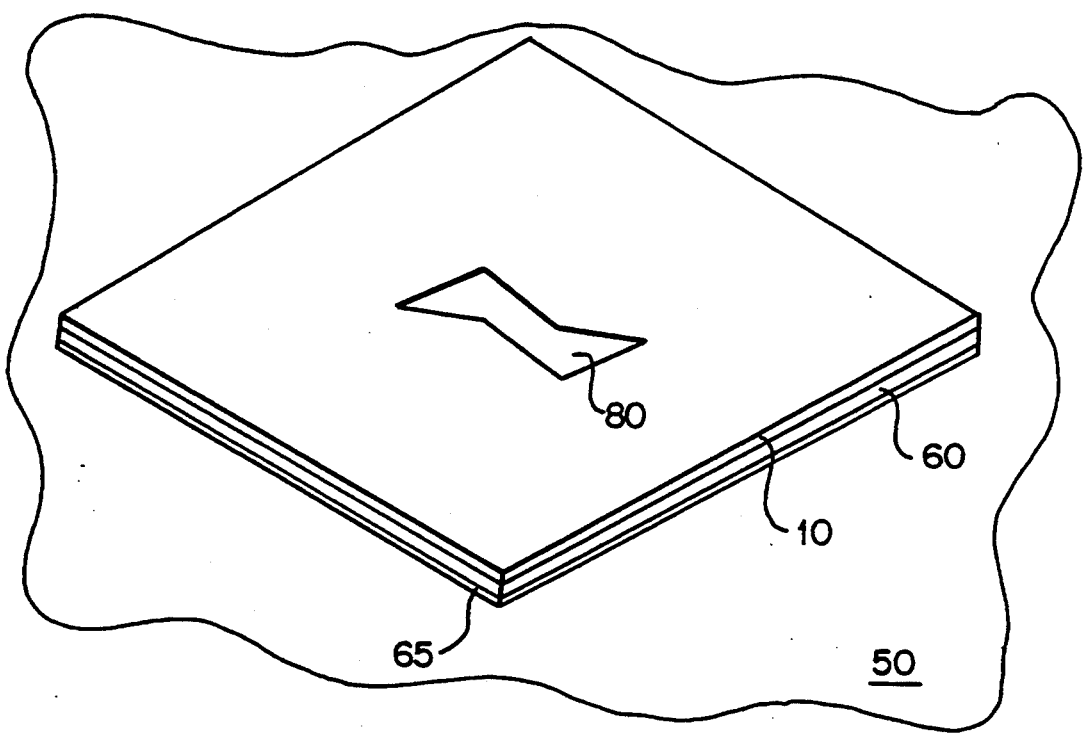
FIG. 6 is a perspective view of the carrier film sheet/solar window film of FIG. 5 having colored solar window film within a vacent region of solar window film.

Referring now to FIG. 6, when colored solar window film 80 is to be inlaid in a graphic, the method further includes making the colored film portion in the same fashion that the solar window film was manufactured as described above. Alternatively, if the colored inlays are not to be machine cut, an appropriate size and color of solar window film 80 is selected. The size should preferably be slightly larger then the area that the film is to cover to achieve a slight overlap with adjacent films. The release liner of the colored solar window film is removed. The previously covered release liner surface of the colored solar window film, as well as the area of the carrier film sheet 55 to which the colored film is to be attached, are wet with the wetting solution. Thereafter, the colored solar window film 80 is placed on the intended area. The colored solar window film 80 is usually applied to the surface of the first solar window film 10 that defines the outline of the illustration of the graphic and the carrier film 60. After the placement of the colored solar window film 80 is accomplished, a force is applied to the colored solar window film by the burnishing device to activate the pressure sensitive liquid activated adhesive so as to secure the colored film to the first film. Before the adhesive has dried, the colored film 80 can be trimmed, if needed, to the size of the area to be filled. The above method can be repeated for each area to be filled with colored solar window film.

Figure 7A:
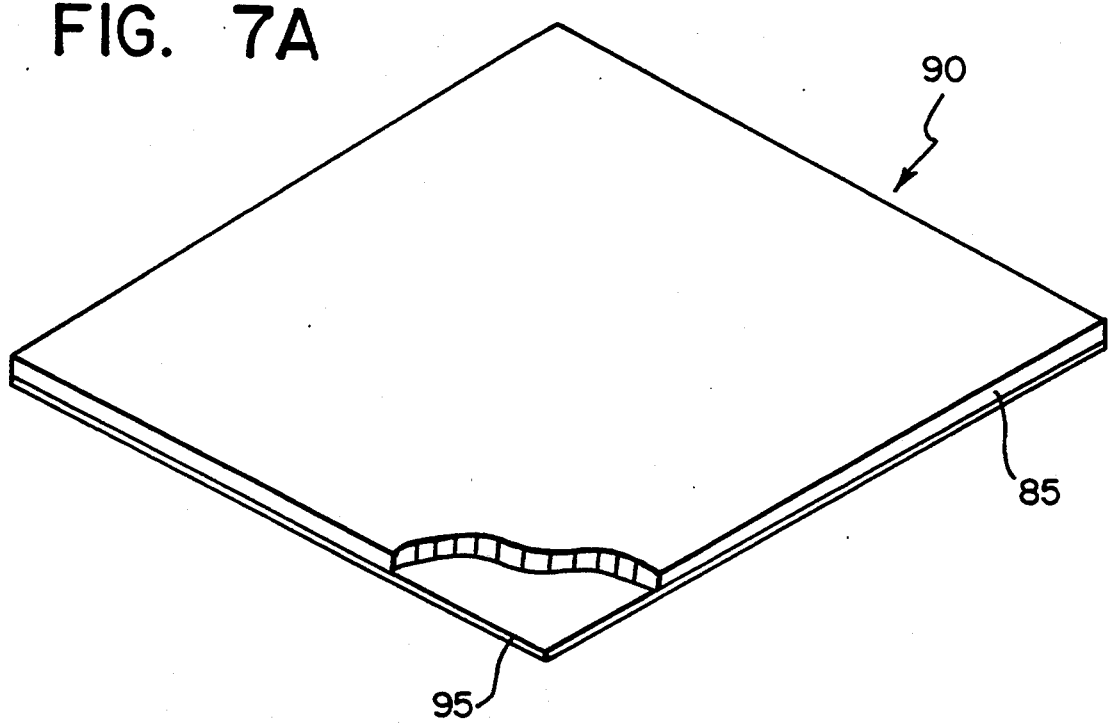
FIG. 7A is a perspective view of the support film sheet including support film and a release liner used in the present invention.
Figure 7B:
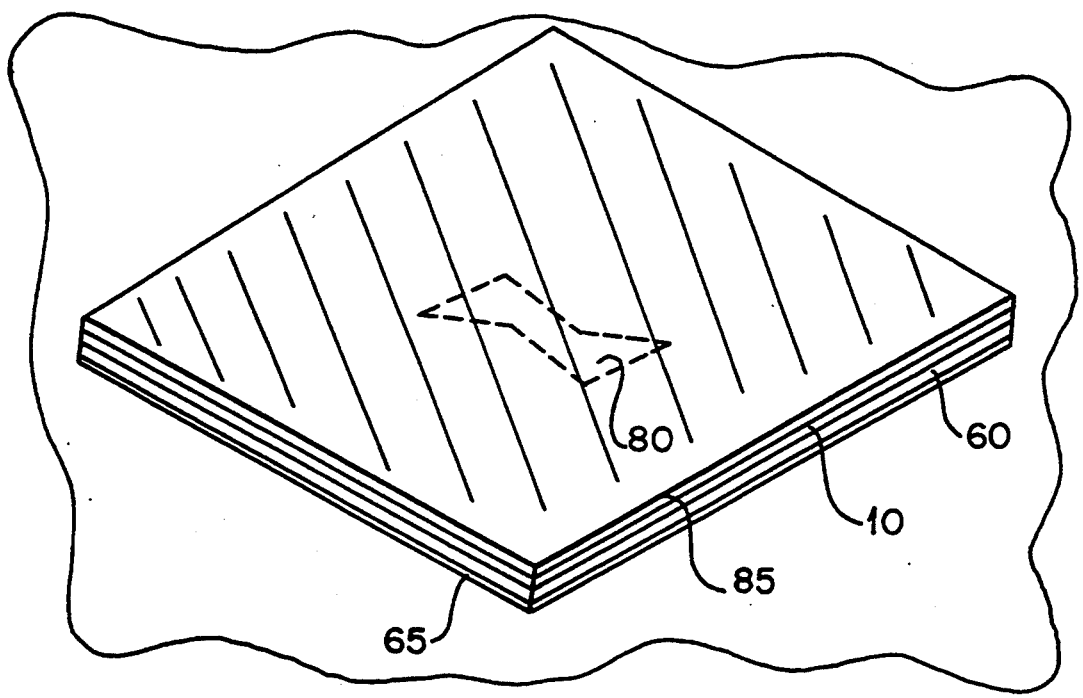
FIG. 7B is a perspective view of the carrier film sheet/solar window film of FIG. 6 having the support film attached to the solar window film.

Referring now to FIGS. 7A and 7B, in the preferred embodiment of the present invention, the method further includes attaching the carrier film 60 having solar window film 10 coupled thereto to a support film 85. Solar window film graphics preferably include a support film 85 because the support film assists in holding solar window film elements in their appropriate places and adds a contrasting layer of color to the design so that the vibrancy of the design and its colors are more evident. Like most window films, the support film sheet 90 includes a release liner 95 attached to one of the surfaces of the support film 85. First, an appropriate size and type of support film 85 is selected. The size of the support film 85 typically coincides with the size of the window to which the graphic is to be affixed. However, the support film 85 can be another size, but is preferably at least as large as the dimensions of the design. The type of support film 85 varies greatly depending upon the specific application. Examples of typical support films include frost-white translucent film, silver-transparent metallic reflective film, etched frost film, and gold-transparent metallic reflective film. The type of film used is selected in accordance with the design demands such as the site specifications and the desired background color of the solar window film graphic.

After the support film 85 is chosen, the graphic defined by the solar window films is cleaned using either a soap solution or a mild alcohol solution in order to remove any adhesive, dirt, debris or other residue which might later cause discoloration or air pockets when the support film is attached. Both surfaces of the support film 85 are lightly sprayed with the wetting solution to eliminate any static charge that my have been generated and the release liner 95 of the support film 85 is removed. While ensuring that the carrier film 60 is still substantially flatly attached to the flat surface 50, the support film 85 is pulled taut so that the support film is substantially planar. The support film 85, while still taut, is then superposed with the solar window film 10 so that a center point of the support film coincides with a center point of the solar window film/carrier film element 75.

The support film 85 is applied to the solar window film 10 by slowly releasing the tension applied to the support film. This causes a middle portion of the support film to be lowered. The tension is released until the middle portion contacts the solar window film/carrier film element 75. Thereafter, the tension on the support film 85 is successively released and the support film is lowered until all portions of the support film touch the solar window film/carrier film element 75. A relatively gentle force is applied to the top surface of the support film with a burnishing device starting from the center point and gradually moving toward the edges of the support film. In order to insure that a sufficient bond has been created between the solar window film 10 and the support film 85, a second relatively firm force is then applied with a heavier burnishing device. Thereafter, the bond between the carrier film release liner 65 and the flat surface 50 is broken so that the entire film graphic (the support film, solar window film and carrier film) can be flipped 180° so that the carrier film release liner 65 is facing upward and away from the flat surface 50. A final firm force is applied to the carrier film release liner 65 utilizing the burnishing device as previously described. If the area of the support film is larger than that of the carrier film, the edges of the support film can be trimmed to coincide with the perimeter of the carrier film. Thereafter, the entire graphic is allowed to dry so that the adhesive can adequately bond all film layers of the film graphic 100. In the preferred embodiment, the drying process is performed in a dust free environment for between 2 and 14 days.

Figure 8:
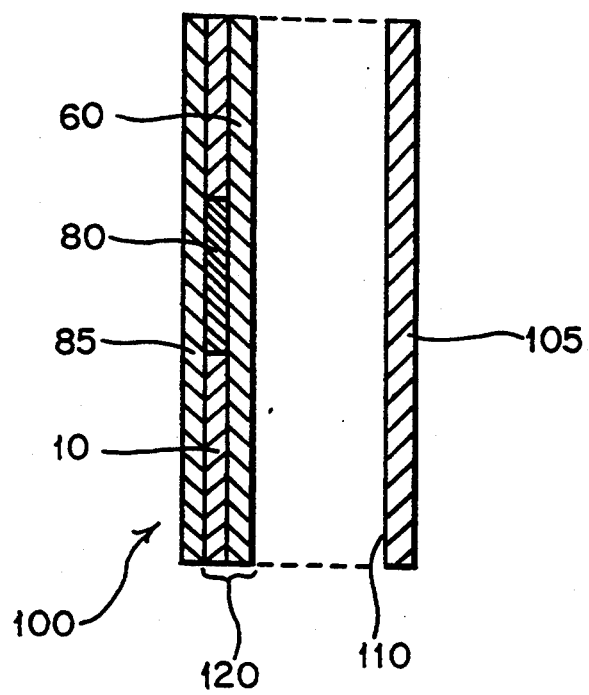
FIG. 8 is a cross-sectional view of the application of the solar window film graphic to a window surface.

Referring now to FIG. 8, once the drying process has been completed, the solar window film graphic 100 is transported to the window 105, storefront or other smooth surface to which the graphic is to be attached. The interior surface 110 of the window 105 is scraped to remove debris and cleaned with a cleaning solution such as an alcohol solution and allowed to dry. Thereafter, the solar window film graphic 100 is positioned substantially parallel to the interior window surface 110 to which the solar window film graphic is to be applied, the carrier film release liner 65 (not shown) is removed and the now exposed surface of the carrier film 60 along with the interior surface 110 of the window 105 are sprayed with the wetting solution. The solar window film graphic 100 (carrier film surface) is then placed against the window surface 110 such that corresponding edges of the surface of the solar window film graphic coincide with the edges of the window. A force is applied to the surface of the solar window film graphic with a burnishing device, as previously described, to insure that an adequate bond has formed to affix the solar window film graphic to the window surface. The graphic is then permitted to dry.

Figure 9A:
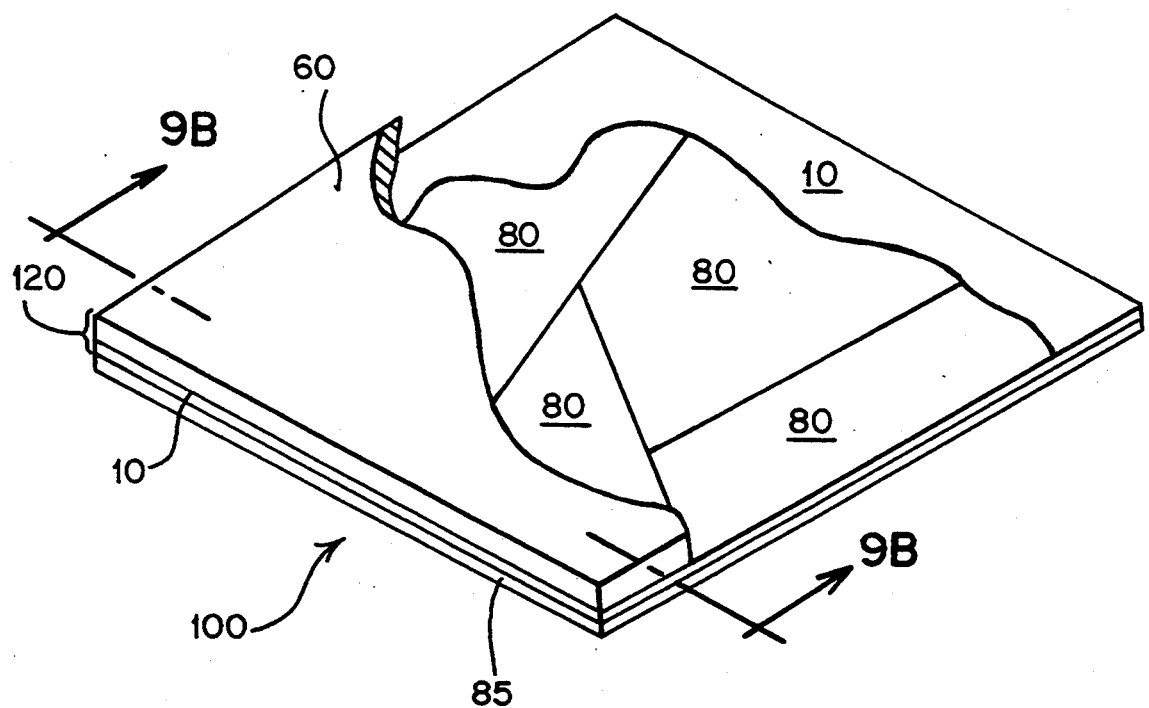
FIG. 9A is a perspective view of the prefabricated solar window film graphic constructed in accordance with the present invention.
Figure 9B:
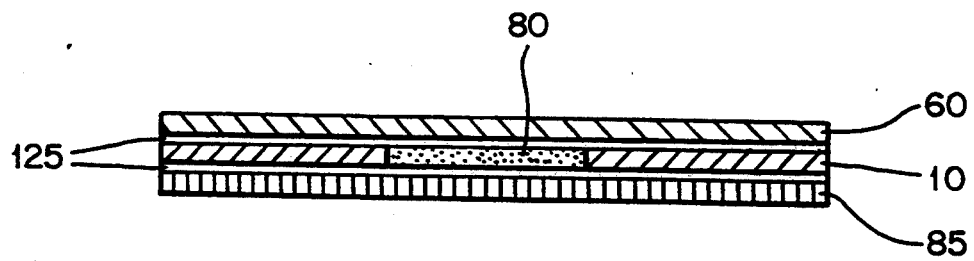
FIG. 9B is a cross-sectional view of the prefabricated solar window film graphic taken along lines a—a of FIG. 1.

In accordance with another form of the present invention and as shown in FIGS. 9A and 9B, a solar window film (SWF) graphic 100 for attachment to a surface is provided. The SWF graphic includes a support film layer 85 coupled to a graphic layer 120. The graphic layer includes a plurality of solar window film portions 80, 10 wherein each solar window film portion has a shape, color and size corresponding to a position in the design. The graphic layer 120 also includes a substantially optically clear carrier film 60 secured to the plurality of solar window film portions. Each of the plurality of solar window film portions 80,10, optically clear carrier film 60 and support layer are covered, on at least one surface, by a transparent adhesive material 125 which is preferably an optically clear pressure sensitive liquid activated adhesive for securing adjacent film layers to one another.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A method of fabricating a solar window film graphic for attachment to a surface, the method comprising:

a) providing a design to a computer-aided design system;

b) determining on said computer-aided design system, a preferred representation of said design;

c) providing said preferred representation of said design to a computer-aided machining system having a cutting tool;

d) cutting substantially through a solar window film of a first film sheet with the cutting tool under the controlled guidance of said computer-aided machining system, the first film sheet including a first component defined by the solar window film and a second element defined by a solar window film release liner, the solar window film defining a first surface of the first film sheet and the solar window film release liner defining a second surface of the first film sheet, the solar window film being coupled to the solar window film release liner, the cutting through the solar window film defining at least a first portion of the solar window film representing the design and a second portion of the solar window film representing an extraneous portion of the solar window film;

e) removing the second portion of the solar window film from the first film sheet to provide a region vacant of solar window film;

f) attaching a transfer tape to the first surface of the first film sheet to provide a pre-masked film sheet, the pre-masked film sheet having a first surface defined by the transfer tape, an interior layer defined by the solar window film and a second surface defined by the solar window film release liner;

g) removing the solar window film release liner from the pre-masked film sheet to provide an unlined pre-masked film sheet having a first surface defined by the solar window film and a second surface defined by the transfer tape;

h) securing the unlined pre-masked film sheet to a carrier film sheet defining a carrier film graphic, the carrier film sheet having a first portion defined by the carrier film and a second portion defined by a carrier film release liner, the first surface of the unlined pre-masked film sheet substantially contacting the first portion of the carrier film sheet, the carrier film graphic having a first surface defined by the transfer tape, a first layer defined by the solar window film, a second layer defined by the carrier film and a second surface defined by the carrier film release liner;

i) removing the transfer tape from the carrier film graphic; and j) coupling a support film sheet to the carrier film graphic, the first layer of the carrier film graphic substantially contacting a surface of the support film sheet.

2. The method of fabricating a solar window film graphic as defined by claim 1 wherein the support film sheet has a first surface defined by a support film and a second surface defined by a support film release liner and wherein step (j) further comprises:

removing the support film release liner from the support film sheet prior to coupling to the carrier film graphic, the support film sheet being secured to the carrier film graphic.

3. The method of fabricating a solar window film graphic as defined by claim 1 wherein each surface of the solar window film, carrier film and support film includes a liquid activated adhesive thereon, and wherein prior to attaching and securing the window film, carrier film and support film, the method including:

substantially wetting a surface of at least one of the window film, carrier film and support film with a suitable liquid for activating the liquid activated adhesive.

4. The method of fabricating a solar window film graphic as defined by claim 1, the computer-aided design system including a data base having a plurality of designs stored therein, wherein step (a) further comprises:

utilizing at least one of the plurality of designs stored in the data base of the computer-aided design system for generating the design.

5. The method of fabricating a solar window film graphic as defined by claim 1, wherein step (a) further comprises:

scanning a design into the computer-aided design system with scanning means.

6. The method of fabricating a solar window film graphic as defined by claim 1, the design model including a plurality of colored regions, wherein after step (h), the method further comprising:

providing a colored solar window film to the vacant region of solar window film of the unlined pre-masked film sheet to provide a substantially shaded region.

7. The method of fabricating a solar window film graphic as defined by claim 6 further comprising:

1) selecting a second film sheet having a colored solar window film secured to a colored solar window film release liner;

2) removing the colored solar window film release liner; and 3) securing the colored solar window film to the vacant region of the second surface of the solar window film carrier graphic.

8. The method of fabricating a solar window film graphic as defined by claim 7 wherein at least one of the solar window film and carrier film have liquid activated adhesive thereon, and wherein the step of securing the colored solar window film to the vacant region of the second surface of the solar window film carrier graphic further comprises:

wetting at least one of the second solar window film and the second surface of the solar window film carrier graphic to activate the liquid activated adhesive; and providing a substantially downward force having components which are perpendicular and parallel to the to the colored solar window film to ensure adhesion of the colored window film to the second surface of the carrier film graphic.

9. The method of fabricating a solar window film graphic as defined by claim 1 wherein prior to step (e), the method further comprises:

securing the first film sheet to a substantially flat surface for removal of the extraneous portion of the thin film material.

10. The method of fabricating a solar window film graphic as defined by claim 1 wherein prior to step (f), the method comprises:

1) providing a tensioning force to the first film sheet so that the first film sheet is substantially planar; and 2) placing the tensioned first film sheet upon a substantially planar surface so that the solar window film release liner is superposed with respect to the substantially flat surface.

11. The method of fabricating a solar window film graphic as defined by claim 10 wherein the transfer tape has first and second surfaces and first and second ends, the first surface of the transfer tape having an adhesive material substantially thereon, and wherein step (f) further comprises:

1) providing a tensioning force to the transfer tape so that the transfer tape is substantially planar, the tensioned transfer tape being proximate to the first side of the film sheet;

2) securing the first side of the transfer tape to the first side of the first film sheet, the securement progressing from the first end of the transfer tape to the second end of the transfer tape, a substantially downward force having components which are perpendicular and parallel to the tensioned transfer tape being applied to the second side of the transfer tape to ensure adhesion of the transfer tape to the film sheet.

12. The method of fabricating a solar window film graphic as defined by claim 11 wherein the carrier film sheet includes first and second ends, and wherein the step (h) further comprises:

1) providing a tensioning force to the carrier film sheet so that the carrier film sheet is substantially planar;

2) superposing the first surface of the tensioned carrier film sheet with a substantially planar surface so that the carrier film sheet release liner is in contact with the substantially planar surface;

3) moistening the first surface of the unlined pre-masked film sheet and the first surface of the carrier film sheet;

4) superposing the first surface of the unlined pre-masked film sheet with the first surface of the carrier film sheet;

5) securing the first surface of the unlined pre-masked film sheet to the first surface of the carrier film sheet, the securement progressing from the first end of the carrier film sheet to the second end of the carrier film sheet, a substantially downward force having components which are perpendicular and parallel to the unlined pre-masked film sheet being applied to the second surface of the unlined pre-masked film sheet to ensure adhesion of the unlined pre-masked film sheet to the carrier film sheet;

6) removing the transfer tape from the unlined pre-masked film sheet to provide a solar window film carrier sheet having a first surface defined by the solar window film material, a middle layer defined by the carrier film and a second surface defined by the carrier film release liner, the solar window film carrier sheet having first and second ends;

7) wetting the first surface of the solar window film carrier sheet;

8) applying a protective film covering to the solar window film carrier sheet first surface;

9) providing a substantially downward force having components which are perpendicular and parallel to the solar window film carrier film, the substantially downward force being applied to the protective film covering of the solar window film carrier sheet to ensure adhesion of the solar window film material to the carrier film, the substantially downward force being successively applied from the first to the second end of the solar window film carrier sheet; and 10) removing the protective film covering from the thin film carrier sheet.

13. The method of fabricating a solar window film graphic as defined by claim 1 wherein step (j) further comprises:

1) selecting an appropriate size of the support film sheet, the support film sheet being at least as large as the carrier film graphic, the support film sheet having a support film release liner;

2) providing a tensioning force to the support film sheet so that the support film sheet is substantially planar;

3) removing the support film release liner;

4) superposing the support film with the carrier film graphic;

5) releasing the tensioning force to permit a middle portion of the support film to contact the carrier film graphic, thereafter allowing the remaining portions of the support film to contact the carrier film graphic so that the support film is substantially engaged with the carrier film graphic;

6) providing a force to both the carrier film graphic and the support film, the force having components which are substantially perpendicular and parallel to the support film to ensure that the support film adheres to the carrier film graphic; and 7) removing portions of the support film which are not superposed with the carrier film graphic.

14. A method of fabricating a solar window film graphic as defined by claim 1 wherein step (d) further includes cutting through the solar window film and scoring the solar window film release liner.

* * * * *